United States Patent [19]

Nausedas

[11] Patent Number: 4,583,264
[45] Date of Patent: Apr. 22, 1986

[54] STUFFING APPARATUS HAVING CASTING ARTICLE ENGAGING AND ROTATING MEANS

[75] Inventor: Joseph A. Nausedas, Oak Forest, Ill.

[73] Assignee: Union Carbide Corporation, Danbury, Conn.

[21] Appl. No.: 566,786

[22] Filed: Dec. 29, 1983

[51] Int. Cl.⁴ .............................................. A22C 11/02
[52] U.S. Cl. ......................................... 17/41; 17/1 F
[58] Field of Search ............... 17/1 F, 1 R, 33, 35, 17/41, 42, 49; 53/576, 581, 585

[56] References Cited

U.S. PATENT DOCUMENTS

| | | | |
|---|---|---|---|
| 1,043,241 | 11/1912 | Louden, Sr. | 17/41 |
| 1,302,194 | 4/1919 | Mayer . | |
| 2,168,693 | 8/1939 | Walter | 17/33 |
| 3,115,668 | 12/1963 | Townsend | 17/33 |
| 3,264,679 | 8/1966 | Moekle | 17/33 |
| 3,826,853 | 7/1974 | Levaco | 426/132 |
| 3,835,503 | 9/1974 | Townsend et al. | 17/35 |
| 3,873,744 | 3/1975 | Townsend et al. | 426/284 |
| 3,964,128 | 6/1976 | Townsend et al. | 17/33 |
| 3,964,236 | 6/1976 | Smith | 53/122 |
| 4,358,873 | 11/1982 | Kollross | 17/33 |

FOREIGN PATENT DOCUMENTS

2605745 8/1977 Fed. Rep. of Germany .

*Primary Examiner*—Willie G. Abercrombie
*Attorney, Agent, or Firm*—Roger Aceto

[57] ABSTRACT

A stuffing machine having a displaceable connector engagable with a cored casing article held in a stuff position for communicating the cored casing article to a discharge outlet of the stuffing machine. The machine further has a centrifugally operated drive clutch which is displaced onto the casing article and which thereafter upon activation closes about the casing article for rotating the article about its longitudinal axis during stuffing.

29 Claims, 5 Drawing Figures

STUFFING APPARATUS HAVING CASTING ARTICLE ENGAGING AND ROTATING MEANS

RELATED APPLICATIONS

U.S. Pat. No. 4,489,460 issued Dec. 25, 1985 and U.S. application Ser. Nos. 566,787, now U.S. Pat. No. 4,545,091 issued Oct. 8, 1985, and 566,828 both filed Dec. 29, 1983 and U.S. application Ser. No. 583,317 filed Feb. 24, 1984 are related to the subject application.

BACKGROUND OF THE INVENTION

The present invention relates generally to a casing article and, more particularly, to a cored casing article and to an apparatus and method adapted to utilize the article in a stuffing operation.

Tubular casing articles and apparatus, as may be used for the high speed automatic production of encased food products, such as frankfurters or the like, are well known in the art. Such automatic high speed production requires that relatively long lengths of casing be supplied to the stuffing apparatus. It is conventional to supply the casing in the form of a compacted shirred tubular casing article called a "shirred stick". It is not uncommon for a shirred stick measuring 20 inches in length to contain upwards of 160 feet of casing. The sticks, which are coherent and resistant to breakage, can be handled by the mechanical loading apparatus of a stuffing machine. Conventional apparatus for stuffing and linking this entire casing length in less than a minute is also known in the art, one such apparatus being described in U.S. Pat. No. 3,115,668.

The present invention concerns an improved stuffing apparatus as may utilize a casing article of the type wherein the shirred casing is predisposed on a disposable stuffing tube, the apparatus in particular being of the general type as disclosed in said U.S. Pat. No. 3,115,668.

The casing article as used on the apparatus of the present invention includes a substantially rigid tubular core member disposed within the bore of the casing stick. It is sufficient for the purposes of the present invention that the inner periphery of the casing stick be in contact about the outer periphery of the tubular core, preferably over the full length of the casing stick. Moreover, this contact should be sufficient to provide a resistance to relative motion between the core and the casing stick. The core also should have as thin a wall as possible, yet be able to withstand the stresses generated by the casing being in contact about the core. In other words, the tubular core must not be so thin walled or weak as to buckle under the casing generated stresses. The core should also be strong enough to withstand the internal pressures exerted on the core by the food emulsion passing through the core during the stuffing operation.

Various advantages are exhibited by cored casing articles. For example a cored casing article has a greater coherency, that is, a greater ability of the stick to resist breaking than a conventional shirred casing stick which does not have a tubular core member. Resistance to breaking renders the casing article better able to resist the rigors of manual handling and of automatic handling by the stuffing apparatus.

Another advantage is that, due to the physical support offered by the core, a cored article can contain a greater length of casing than an uncored article. This is a very desirable feature in automatic stuffing operations since greater casing lengths translate to faster production and less machine downtime while a new casing article is being loaded into stuffing position.

Also, with longer casings there are fewer casing ends to deal with. This reduces labor involved in both tying stuffed casing lengths together for subsequent processing, and in removing food product from any malformed end links. With fewer ends to tie, the amount of waste casing is reduced, the amount of food product rework is reduced and, in general, the yield is increased by the resulting increase in the number of stuffed links produced per shirred stick.

In any event, for purposes of the present invention, the shirred stick on the core preferably is in contact about the outer periphery of the core over substantially the full length of the stick. This contact is sufficient to provide a resistance to relative motion between the core and shirred stick so the stick tends to stay fixed to the core as casing is deshirred from the stick.

Another advantage of cored casing articles is that the core itself can function as a stuffing horn and in particular as a disposable, one-use stuffing horn. Here, the core would have an aft end attachable to the discharge of the stuffing machine and a fore end from which the food product exits for introduction into the casing.

Accordingly, the apparatus of the present invention is provided with components which interface with a cored casing article to permit the core to function as the stuffing horn of the apparatus, and in particular, as a rotating stuffing horn. In order for the stuffing machine to stuff these casing articles in a continuous and automatic stuffing operation, the stuffing machine must repeatedly and reliably perform a sequence of functions. For example, the machine must put the tubular core of the casing article into communication with the discharge outlet of the stuffing machine. The drive of the machine must then engage and rotate the article about its longitudinal axis during the stuffing of a food emulsion through the core. A seal must be effected between the discharge outlet and the tubular core to prevent leakage of food emulsion during the stuffing operation, and the axial loading on the tubular core caused by the stuffing pressure must be resisted. Finally, the drive must be disengaged from the tubular core and the core disconnected from the discharge outlet when the casing has been stuffed. Thus, one aspect of the invention involves providing a rotary drive means which is adapted to rotatably engage and drive the core, take up the thrust load on the core caused by the emulsion pressure, and provide a static seal between the core and the stuffing machine discharge.

These and other advantages, objects, and characterizing features of the present invention will become more apparent upon a consideration of the following detailed description thereof, which is directed to an improved automatic stuffing machine, having an improved rotating drive chuck assembly, clutch and discharge configuration for the machine to permit utilization of the cored article.

SUMMARY OF THE INVENTION

The apparatus according the present invention includes means for holding the casing article, comprising a tubular core having shirred casing predisposed on the core, in a stuffing position wherein the aft end of the tubular core is spaced from an outlet of the machine, the longitudinal axis of the tubular core being in axial alignment with the outlet. A connector means is displaceable relative to the article held at the stuffing position for connecting the aft end of the tubular core of the article in communication with the outlet. The apparatus further has a rotary drive means including at least one rotatable driving part which is displaceable to and away from a location for driving a drivable part on the casing article which has its tubular core connected in communication with the outlet. Moreover, the driving part, when at its driving location, is engageable with the drivable part on the tubular core to rotate the article, including the core and the shirred casing predisposed on the core, about the longitudinal axis of the casing article while foodstuff is being passed through the tubular core to stuff the casing.

The apparatus according to the present invention is also characterized by a rotating drive means, at the discharge of the stuffing apparatus, which is adapted to releasably engage an aft end of a rigid tubular member and which places the tubular member in communication with the discharge so that food product passes directly into and through the tubular member and into the casing carried by the tubular member. The machine also includes a rotating chuck spaced forward from, and in axial alignment with, the rotating drive means at the discharge. The chuck has a central opening to receive filled casing passing from the fore end of the tubular member so the rotation of the chuck functions to spin the encased product about its longitudinal axis.

DESCRIPTION OF THE PREFERRED EMBODIMENTS

Figure 1:
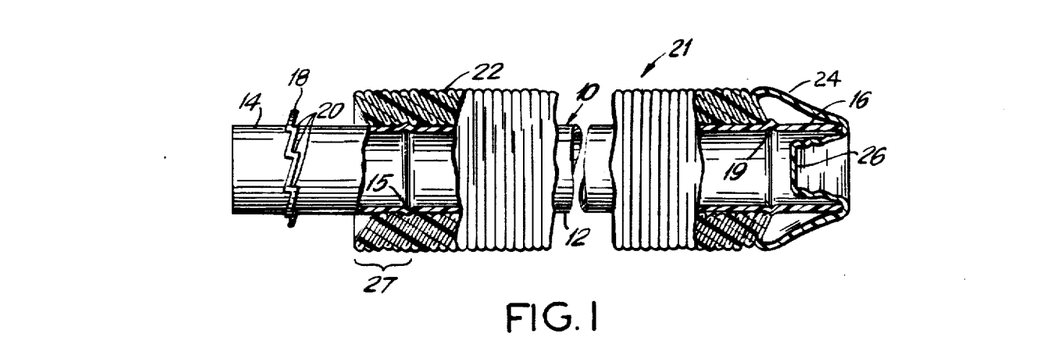
FIG. 1 is a view, partly broken away and in section, as may be provided for use with a stuffing machine according to the cored casing article of the present invention.

Referring to the drawings, FIG. 1 shows a sheared casing article having a tubular core 10 as may function as a disposable stuffing horn. The core consists of an elongated tubular body 12 and has an aft end 14 and a fore end 16. The core is preferably made of a relatively inexpensive material having a high creep strength such as polyvinylchloride which lends itself to the fabrication of disposable, single use items.

On an aft end 14 of core 10 is an engagement means 18. The engagement means comprises a flange oriented in a plane generally perpendicular to the longitudinal axis of the core. One or both upright faces of the flange includes a plurality of ratchet steps 20.

As will be described hereinbelow, these ratchet steps 20 provide axially and radially disposed abutment surfaces which are engageable and driven by the rotating drive of the stuffing machine for rotating the core. In this context, then, other possible shapes or configurations of driven members on the core, which would complement the shape of a rotating drive of the stuffing machine, would be readily apparent to one skilled in the art.

As shown in FIG. 1, there is predisposed on the tubular core 10, a supply of casing in the form of a shirred stick 22.

Techniques for forming a conventional shirred stick 22, that is one without a core, are well known in the art and will not be described in detail. It is sufficient for purposes of the present invention merely to say that it involves a shirring process wherein a relatively long length of casing is shirred about a mandrel by any one of several conventional techniques to produce a relatively short shirred stick.

Still further length reduction can be accomplished by subjecting the shirred stick to an axial force so as to compact the pleats formed by shirring. The end result is that it is not uncommon in the art to have a shirred stick which is only about 1% of the length of the unshirred casing, that is, a shirred stick 22 measuring one foot in length may contain 70 to 100 or more feet of casing.

There are various ways of providing the compacted casing or stick with a core. For example, the stick can be doffed from the mandrel and onto a core to provide the cored casing article 21. As an alternative, the shirred casing can be transferred to the core and compacted while on the core. Other ways of providing the casing with a core should be readily apparent to one skilled in the art.

For purposes of the present invention, the contact and engagement of the casing about the core should be sufficient to resist relative motion between the shirred stick and core. This will permit the stick to spin with the core. That is, any rotation of the core about its longitudinal axis should result in a like rotation of the shirred stick so that the entire casing article 21 can rotate as a unit.

In the article as shown in FIG. 1, the shirred stick is arranged so that the last pleats of casing shirred, that is those adjacent fore end 16, are the first to deshirr when the casing is stuffed. This is the opposite of more conventional stuffing techniques when using uncored articles wherein the first casing shirred is also the first casing to be deshirred.

The reason for this preferred opposite convention when using cored articles of the type described herein, is that it permits pleats to deshirr from the stick without the possibility of tearing any pleat which may be pinched to the core by adjacent pleats in the stick.

In any event, after the shirred stick is loaded onto the tubular body 12 of the core, a portion of the casing adjacent the fore end of the tubular core is deshirred as shown at 24 and pulled forward over the fore end 16. This deshirred portion of casing is formed into an end closure 26 which is positioned to plug the bore opening of the tubular core. Such end closures for uncored articles and the method and apparatus for effecting such an end closure are well known in the art and may be readily adapted for use with cored articles of the type described herein.

FIG. 1 also shows the tubular body 12 as having a raised rib 15 formed adjacent its aft end 14. This rib preferably is formed after shirred stick 22 is in place on the core. The function of rib 15 is to insure that the pleats of an aft end portion 27 of the shirred stick, which is located aft of the rib 15, remains at a fixed location on the core until all of the casing forward of the rib has been deshirred from the stick.

It should be apparent that as casing deshirrs from the stick, the stick gets shorter. As the stick gets shorter, the resistance to relative axial motion between the core and the pleats remaining in the aft end portion of the stick decreases. It is likely, that at some point, the resistance to relative motion, as provided by the contact between the core and the pleats remaining in the aft end portion of the stick, will be less than the force required to deshirr casing from the stick. When this happens the remainder portion of pleats will break free of the core and begin to move longitudinally along the core towards the fore end 16 responsive to the deshirring force.

The longitudinal movement of this remainder portion of pleats could prematurely initiate termination of the stuffing operation. Consequently, rib 15 provides a barrier to delay any longitudinal movement or deshirring of the aft end portion 27 of the stick until after all of the casing forward of this rib has been deshirred from the stick.

Preferably a second raised rib 19 is formed adjacent the fore end of the core. This rib 19 is positioned ahead of the shirred stick and functions to prevent a slug of shirred casing from moving along the core and over the fore end 16 responsive to the force applied to deshirr from the stick. Another function of this rib 19 will be mentioned hereinbelow in connection with the operation of a stuffing machine using the cored casing article described herein.

In a preferred embodiment, casing article 21 will include features of a so called "cored high density" article. Cored high density articles per se are subjects of a copending application Ser. No. 363,851, the disclosure of which is incorporated herein by reference so that such articles are not described in detail herein. However, by way of illustrating a preferred embodiment of the present invention, an example of a preferred casing article, including cored high density features and its method of manufacture, is described hereinbelow.

Briefly, one feature of a cored high density article is that it contains a longer length of casing for the same shirred length and is more highly compacted than conventional, uncored casing articles. The high degree of compaction considerably increases the forces exerted on the core due to the inherent resiliency of the highly compacted casing and its tendency to expand inwardly upon the core as internal stresses within the stick relax with time to an equilibrium condition with the core.

Production of a casing article 21 having cored high density features may begin with a conventional shirring step wherein a conventional cellulosic casing, as may be used in the manufacture of frankfurters, is shirred on the mandrel of a shirring machine in a conventional manner by any one of several shirring methods. A preferred shirring method is the subject of U.S. Pat. No. 3,779,284, the disclosure of which is incorporated herein by reference. Typical cellulosic casings of this type may have a stuffed diameter of about 0.81 inches, a wall thickness of about 0.001 inches and a moisture content of between about 12–16% and preferably, at least about 13% by weight.

A conventional shirred stick, of such casing might contain about 160 feet of casing. For purposes of the present invention, it is preferred that the shirred stick contain about 250–285 or more feet of casing.

After shirring, the stick undergoes a compaction step which further reduces its length. Compaction methods are known and, in general, involve placing the shirred stick on a mandrel having a desired outside diameter, and then moving a compaction arm against one end of the stick to compress it up against a restraint. This compacts the stick while maintaining a desired bore size.

In a preferred compaction method, as disclosed in a copending application Ser. No. 436,057, compaction arms are simultaneously moved against both ends of the shirred stick to simultaneously move and compress both ends of the stick towards the middle. This method was found to facilitate compaction and to permit a relatively high degree of compaction with a relatively low compaction force.

Compaction of 285 feet of casing to a length measuring about 19 inches results in a pack ratio of about 180. "Pack Ratio" is a term of art and is simply the unshirred casing length in inches divided by the final compacted length in inches.

After compaction, the shirred stick is doffed from the mandrel and onto the tubular core 10 of the casing article. Preferably, the shirred stick is loaded onto the core over the fore end 16 and pushed along the core toward flange 18.

It is well known that a shirred stick is resilient and will tend to expand axially as soon as the compressive forces are relaxed and restraints on the compacted casing are relieved. The bore of the shirred stick will also being to grow smaller in diameter as the stick expands radially inward into the volume previously occupied by the mandrel. Accordingly, the core must have a high creep strength to resist the forces generated by the resilient shirred stick.

Also, to facilitate transfer of the shirred stick to the core, the outside diameter of the core should be slightly less than the outside diameter of the mandrel on which the strand of shirred casing is compacted. For example, for a typical size of frankfurter casing, it was found that the shirred stick can be doffed from the mandrel having a 0.510 inch outside diameter onto a core having an outside diameter of 0.500 inches.

An example of a tubular core which is able to resist the forces generated by the shirring and compacting of 285 feet of casing to a 19 inch stick is one made of rigid polyvinyl chloride, about 22¾ inches long and having an inside or bore diameter of about 0.450 inches and a wall thickness of about 0.025 inches.

After placement on the core, there is some axial growth of the shirred stick so that a final pack ratio may drop from the original compressed pack ratio of 180 to about 159–160. Also, there may be a reduction of bore size of the core. That is the shirred stick may exert a radial inward force on the core sufficient to cause the inside diameter of the core to decrease from about 0.450 inches to about 0.440 inches.

After the shirred stick is loaded onto the core, rib 15 and, if desired, rib 19 are formed. These ribs can be cold formed by inserting a tool into the bore of core 12 and then operating the tool to raise the ribs. Neither rib 15 nor rib 19 need be very large to function. For example, with the size core and casing as described herein, a rib 15 about 0.03 inches high will be sufficient to function as a deshirring control means. Preferably, the forward rib 19 is larger as it may perform an additional function as further described herein below.

About 10–14 inches of the casing is then deshirred and drawn over the fore end of the core. This deshirred casing is formed into a plug 26 and inserted into the bore of the tubular core as shown in FIG. 1.

Thus, a preferred cored high density casing article of the type shown in FIG. 1, with frankfurter size casing, would contain about 285 feet of casing and measure about 22¾ inches from one end of the core to the other. This is in contrast with a more conventional, i.e. uncored, shirred stick for the same size of casing, which measures about 20½ inches in length and contains only about 160 feet of casing. The bore size of the preferred article of about 0.440 inches would be comparable to the inside diameter of a stuffing horn as may accommodate the more conventional uncored shirred stick.

Figure 2:
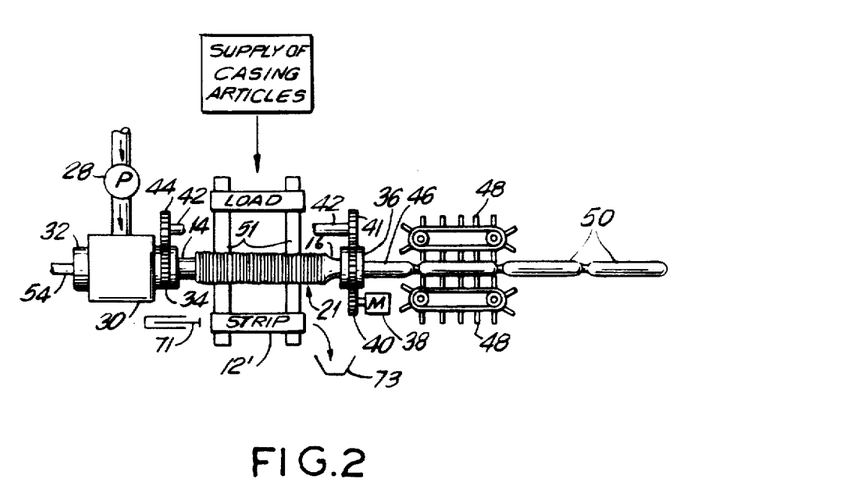
FIG. 2 is a schematic representation of parts of a stuffing machine providing for utilizing the casing article of FIG. 1.

Referring to FIG. 2, there is shown, diagramatically, components of a stuffing machine as may employ the casing article 21 of FIG. 1. The stuffing machine is preferably a type as described in U.S. Pat. No. 3,115,668 except as modified as described herein, which is used in the production of frankfurters, or the like. Reference is made to that patent for a more detailed description as to the function and operation of components not herein described.

Briefly, for the purpose of the present invention, it is merely sufficient to say that the machine includes a pump 28 which is connected to a source of food product (not shown). The discharge of the pump is connected to a manifold chamber 30, including a sliding valved conduit 32.

Rotatably disposed about sliding conduit 32 is a connector and drive means 34 which connects to the aft end 14 of the tubular core for rotating the casing article 21 about a longitudinal axis. The fore end 16 of the casing article 21 is received in a rotary means such as a forward chuck 36 which is rotatably driven by a drive motor 38 through a spur gear 40. A second gear 41, which is driven by forward chuck 36, is connected through shaft 42 and gear 44 to the connector and drive means 34 so that both the means 34 and the forward chuck 36 rotate in the same direction and at the same speed.

The casing is stuffed by emulsion emerging from the core. The stuffed casing 46 passes through chuck 36 and is engaged and rotated by the chuck. From chuck 36, the rotating stuffed casing passes through a linker mechanism indicated at 48 which links the stuffed casing into individual links 50 in a conventional manner.

For purposes of the present invention, those components of the stuffing apparatus which interface with casing article 21 are described hereinbelow. These components, in particular, include the connector and drive means 34 for receiving and rotatably driving the aft end 14 of the casing article, and the forward chuck 36 which is adapted to receive the fore end 16 of the casing article. These components are shown in further detail in FIG. 3.

Figure 3:
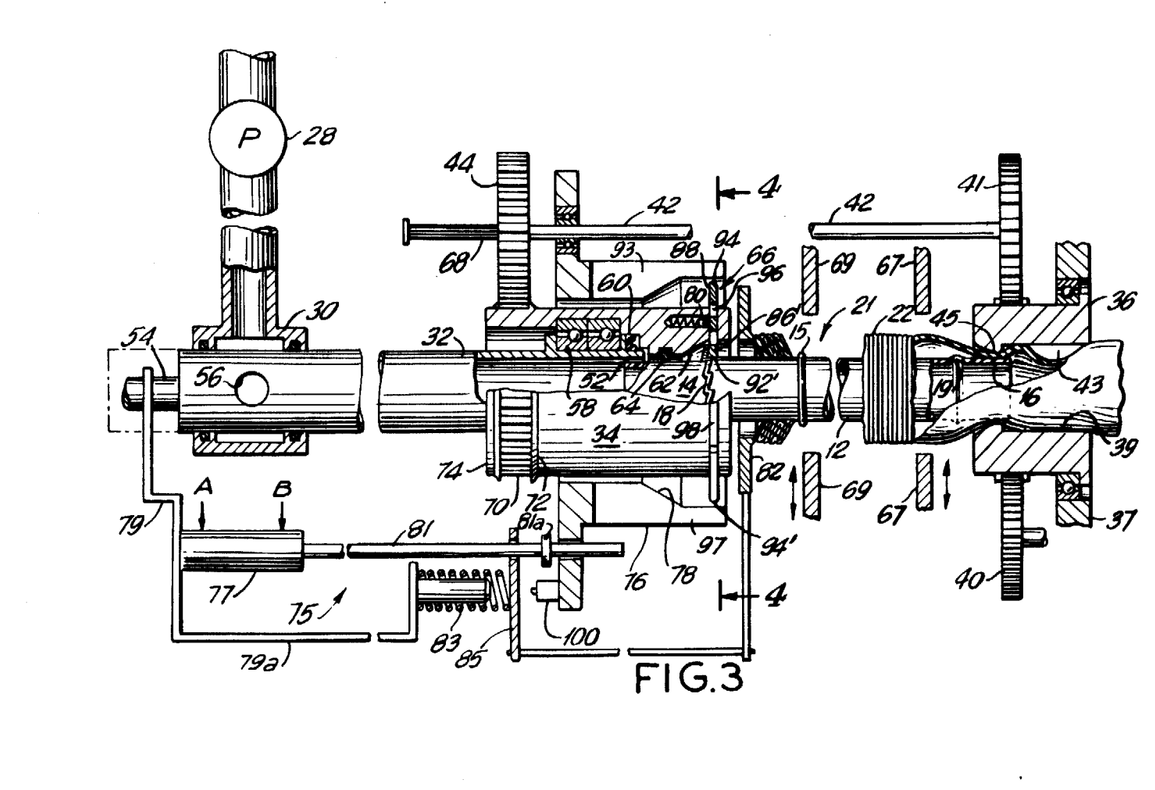
FIG. 3 is a view, partly broken away and in section, of components of the stuffing machine of the present invention in operative association with the casing article of FIG. 1.

Referring to FIG. 3, the connector and drive means 34 of FIG. 1 is more clearly shown as a sleeve and the aft end 14 of the casing article 21 is shown in operative association with sleeve 34 and in communication with the discharge 52 of the sliding valved conduit 32. The conduit 32 is a reciprocating member driven by a piston rod 54 connected to any suitable drive means, not shown. As set out hereinabove, the conduit slides through manifold 30 which is attached to the discharge of pump 28.

The sliding conduit 32 has a port 56 in the wall thereof. In the position shown in FIG. 3, the opening aligns with manifold 30 to permit food product in the manifold to enter the conduit. When the conduit 32 is moved to the left, to a position shown in phantom line, in FIG. 3, port 56 is out of registry with the manifold so that food product cannot pass into the conduit. Thus, sliding conduit 32 functions as a valve to control the flow of food product into the conduit and though its discharge 52.

Mounted on the conduit adjacent discharge 52, is the inner race of a bearing 58. The outer race of this bearing mounts sleeve 34 so that the sleeve can rotate with respect to the conduit. Between sleeve 34 and the conduit is a pressure seal 60. This seal prevents food emulsion from leaking between the conduit and sleeve.

Sleeve 34 has a tapered inlet 62 to facilitate the introduction of the core aft end 14 into the sleeve and then into discharge 52 of the conduit. An inboard seal 64 on the rotating sleeve provides a static seal between the sleeve and the aft end 14 of the core and prevents the escape of food emulsion from between the sleeve and core when the core is in communication with the discharge outlet.

Carried by sleeve 34 and arranged about its tapered inlet 62, is a centrifugally operated clutch device generally indicated at 66. This clutch, as will be described further hereinbelow, engages and rotates the core when sleeve 34 is rotated. The clutch also functions to take up the thrust exerted on the core during the stuffing operation and prevents the core from moving forward responsive to the forces exerted by the food emulsion being pumped through the core.

Sleeve 34 is driven from drive shaft 42 by a spline 68 on the drive shaft, a spur gear 44 slidably carried by the spline, and a ring gear 70 on the sleeve which is meshed with spur gear 44.

In addition, it should be noted that the spur gear 44 is captured to the ring gear by an annular rib 72 on the sleeve at one side of the spur gear and a retaining washer 74 on the other side of the spur gear. With this arrangement the fore and aft movement of conduit 32 will cause a corresponding movement of spur gear 44 along the spline 68 of shaft 42.

Figure 4:
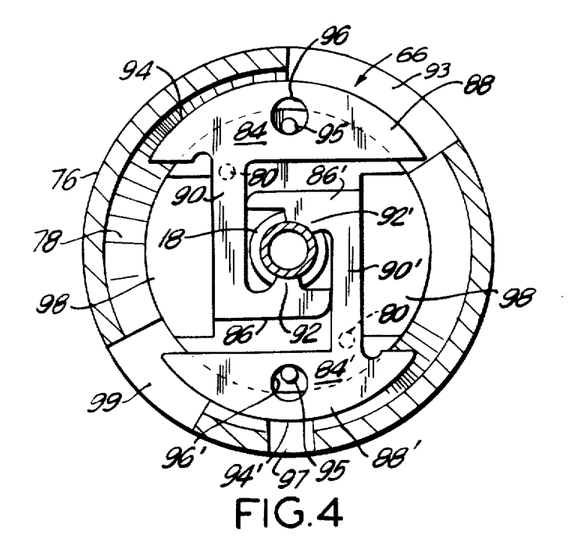
FIG. 4 is a view, on an enlarged scale, taken generally along line 4—4 of FIG. 3.

Referring now to both FIGS. 3 and 4, the centrifugally operated clutch 66 will be described in more detail. As best seen in FIG. 4, the clutch includes two generally U-shaped jaws 84 and 84'. The jaws are identical so that only one jaw 84 will be described in detail. For example, jaw 84 has a leg portion 86 and a head portion 88, which are connected by a base 90. Leg 86 is shorter than the head portion 88 and has a lug portion 92 for bearing against the ratcheted surface of core flange 18. The head portion 88 has one edge 94 which extends beyond the periphery of the sleeve when the sleeve is rotated. This head portion also has an opening 96 for purposes set out hereinbelow.

The jaws are slidably carried by the rotating sleeve so that they can move radially outward under the influence of centrifugal force when the sleeve is rotated. Also, there is a mass imbalance between the leg portion 86 and the larger and heavier head portion 88 so that the two U-shaped jaws 84,84' move radially apart in opposite directions.

The jaws are arranged so that each has its leg 86, 86' extending between the leg and head of the other as shown in FIG. 4. Due to the U-shape of the jaws and the mass imbalance between the head portion 88, 88', and the shorter legs, the short legs 86 and 86' will move towards each other to close lugs 92, 92' about the core as centrifugal force throws the jaws 84, 84' radially outward when the sleeve rotates. As a safety measure, pins 95, (FIG. 4) on sleeve 34 extend through openings 96, 96'. These pins will prevent U-shaped jaws 84, 84' from being thrown from the sleeve should one or another of the shorter legs 86, 86' break while the sleeve is rotating.

The radial motion of the two jaws is limited to diametrically opposite directions by a pair of spaced guides 98 on the sleeve and by the interaction of the two jaws. The spaced guides 98 slidably bear against the outboard surfaces of each jaw base 90 and 90'. In addition, the shorter leg 86 of one jaw slidably bears against the inboard surface of the base 90' of the other jaw. This holds the jaws spaced apart and against the guides so the radial movement of each jaw is, in effect, defined by the guides 98 on the outboard side of the jaws.

Due to the U-shape of the jaws, lugs 92, 92' are disengaged from about the core by moving the two head portions 88, 88' together. Such movement is accomplished by a fixed member 76 on the stuffing machine which surrounds the sleeve. This member has an internal cam surface 78.

When it is time to disengage or open the centrifugally operated clutch 66, rotation of the sleeve is stopped and the sleeve moved aft, or to the left as viewed in FIG. 3. In a first part of this movement, the lugs 92, 92', positioned forward of flange 18 bear against the flange and move it and the tubular core 12 backward to a position in which the fore end 16 of core 12 is outside the confines of the forward rotary drive chuck 36. Then, with continued backward movement of sleeve 34, the outer edges 94, 94' of the clutch jaws are engaged against the cam surface 78 by this aft movement and are pinched inward. This moves the lugs 92, 92' radially away from the core to clear flange 18 thereby releasing the core.

It should be recognized that if the sleeve is stopped with the jaws in a vertical or near vertical position as shown in the figures, one or another of the jaws can move prematurely under the influence of gravity. For example, as illustrated, the short leg 86' of the lower clutch jaw 84' could fall and move lug 92' into a closed position. To prevent such a premature closing, the sleeve has two spring biased detents 80, only one of which is shown in FIG. 3. Each detent bears against a base 90, 90' with sufficient force to hold the U-shaped jaws in a fixed position when the sleeve is not rotating. Thus, the detents will hold jaws 84, 84' until the jaws close under the influence of centrifugal force when sleeve 34 begins to rotate. Thereafter, when rotation stops, detents 80 will hold the jaws in a closed position until the jaws are opened by cam surface 78.

The stuffing apparatus as shown in FIG. 3 also has an end of casing sensor assembly. This sensor assembly includes a follower 82 which is biased against the trailing end of the casing. When follower 82 moves a predetermined distance, thereby indicating that the casing supply is about to be exhausted, a contact 100 is closed. Closing this contact in turn initiates the sequence for stopping both the flow of emulsion and the rotation of the sleeve 34 so that the spent core 12 can be replaced by a core containing a fresh supply of casing.

Operation of follower 82 is controlled by a positioning means generally indicated at 75. This means includes an air cylinder 77 which is fixed to drive rod 54 by a bracket 79.

A bracket extension 79a mounts a coil spring 83. Coil spring 83 is biased between bracket extension 79a and a plate 85. The plate in turn is connected by an angled rod 87 to follower 82. Piston rod 81 extends through a clearance hole in plate 85 and carries a stop 81a as shown in FIG. 3.

Piston 77, when pressurized by the entry of air at port B, retracts the piston rod 81 and stop 81a to move plate 85 against the bias of spring 83. This fixes the follower to the bracket and its extension so that movement of conduit 32 will result in a like movement of the follower 82. Conversely, introducing air through port A extends the piston rod 81 to permit the plate 85 to move with respect to the bracket and its extension responsive to the bias of spring 83. In this fashion, piston 77 and stop 81a act as a lock means to selectively fix and release the follower with respect to bracket 79.

As set out hereinabove, there is a rotary drive chuck 36 at the fore end of the stuffing apparatus. This chuck is journaled to a fixed part 37 of the stuffing machine and has a central passage 39 through which the stuffed casing passes. Flutes 43 within this passage press inward on and grip the stuffed casing and cause it to spin. This allows the linking mechanism as shown in FIG. 2 to operate in a conventional manner.

The inlet end of passage 39 has an emulsion seal 45 which snugs the casing to the core as the casing deshirrs. This prevents the food emulsion, which is being discharged through the core, from back-flowing over the core.

The stuffing machine also includes a carrier for handling casing articles. The carrier, shown schematically at 51 in FIG. 2 moves the casing article to various positions. For example, it receives the casing articles from a supply source and then moves the articles as needed, to a position where the article is in axial alignment between the sleeve 34 and forward chuck 36. After a stuffing operation, which uses up the casing on the article, the carrier moves the empty core to a stripping station where food emulsion remaining in the core is stripped out of the core.

Figure 5:
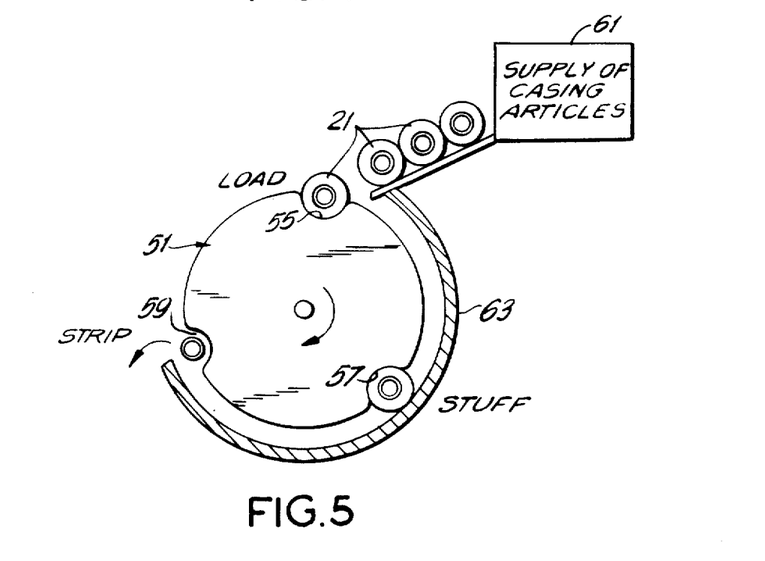
FIG. 5 is schematic representation of a carrier as may be used to position casing articles for stuffing.

FIG. 5 is a schematic representation of a head-on view of a carrier 51. The carrier itself is not part of the present invention and any suitable means may be employed for loading the casing articles onto the stuffing machine and discharging the spent core from the stuffing machine. A detailed description of a preferred carrier is contained in a copending application Ser. No. 481,031 now U.S. Pat. No. 4,489,460. For purposes of the present invention it is sufficient merely to say that the carrier 51, as illustrated, has notches 55, 57 and 59 spaced about its periphery. These notches in the carrier, when oriented as shown in FIG. 5, correspond respectively to the load position, stuff position, and stripping position of FIG. 2. The carrier can rotate, in sequence, between the positions in order to index a casing article from one position to another.

In operation, a casing article 21 is fed from a supply 61 into notch 55. The carrier is then indexed to position notch 55 at the stuff position. At the stuff position the casing article is axially aligned with the longitudinal axis of sleeve 34 and the forward rotary chuck 36. Suitable guides 63 on the machine help to retain the casing article within the notches as the carrier is indexed to this stuff position. After stuffing of the casing, the carrier is then indexed to position notch 55 at the strip position where food emulsion is stripped from the core by push rod 71 (see FIG. 2).

Completing the construction of the stuffing machine as shown in FIG. 3, are a set of fore and aft clamps 67, 69. These clamps, at different stages of the stuffing operation, close about the casing article and, later, about a spent core. This is done to facilitate first the placement of the casing article into operative association with the rotating sleeve 34 and chuck 36 and second, the removal of a spent core from between the sleeve 34 and chuck 36. If desired, a separate floating arm (not shown) can be brought to bear against a casing article in the stuff position to reduce the tendency of the article to whip as the casing article is rotated.

Also, as best seen in FIG. 4, fixed member 76, which surrounds the sleeve 34, has an entry slot 93, a clearance slot 97 and an exit slot 99. These slots are approximately located about the one o'clock, six o'clock and eight o'clock positions when viewing the fixed member headon, as in FIG. 4. FIG. 3 shows that these slots extend rearward along the fixed member. The purpose of entry slot 93 is to permit the aft end 14 of the core to pass through the fixed member 76 when the core is being moved from the load position and into axial alignment with conduit 32 in the stuff position (FIG. 3). Exit slot 99 performs a similar function in that it permits the aft end of the spent core to pass through fixed member 76 when a spent core 12 is being removed from axial alignment with conduit 32. Clearance slot 97 permits the rearward movement of angled rod 87 which carries the follower 82.

The operation of the stuffing apparatus utilizing the casing article 21 now will be described as beginning prior to the time that the casing article is put into stuffing position. At such time, the sliding conduit 32 is in the phantom line position shown in FIG. 3. In this position port 56 is out of alignment with manifold 30 so that no food product flows into the conduit. Also at this time, sleeve 34 is not rotating and the clutch jaw 84, 84' are held open by the operation of detents 80.

Air cylinder 77 is pressurized through port B so that the piston rod 81 is retracted and stop 81a is holding plate 85 against the bias of spring 83. This locates follower 82 to the left of the position shown in FIG. 3 and flush against sleeve 34. Clamps 67, 69 are then open so that a casing article can be moved from the load position to the stuff position by carrier 51.

Casing article 21 is transported by carrier 51 from a supply of such articles, and when moved to the stuff position the article is positioned between the tapered inlet 62 of the sleeve 34 and the forward rotary chuck 36 with the longitudinal axis of the article generally in alignment with the longitudinal axis of the sliding conduit 32. With casing article 21 in this position, clamps 67, 69 are closed about the casing article to hold this axial alignment. The sliding conduit 32 is moved to the right as viewed in FIG. 3 by any suitable means such as a pneumatic cylinder (not shown) acting through drive rod 54.

As conduit 32 moves to the right, the aft end 14 of the core is funneled through the mouth of the tapered inlet 62 and into the discharge 52 of conduit 32. In this way, the conduit picks up the core aft end 14 so that seal 64 at the conduit discharge can engage and slide over the aft end of the core. Movement of the conduit also registers port 56 with manifold 30. Continued movement of conduit 32 towards the right overcomes the friction of closed clamps 67, 69 so that the entire casing article 21 is transported to the right, as viewed in FIG. 3, until the fore end 16 of the tubular core extends into chuck 36.

Clamps 67, 69 are opened and motor 38 is started so that both the sleeve 34 and forward chuck 36 begin to rotate in unison. Rotation of the sleeve 34 will activate the centrifugally operated clutch causing jaws 84, 84' to overcome the holding force of the detents 80. The jaws can slide outwardly under the influence of centrifugal force to displace the lugs 92, 92' radially inward to a position for engagement against the core as described hereinabove and in front of flange 18.

The pressure in air cylinder 77 is switched from port B to port A. This extends piston rod 81 and causes stop 81a to release plate 85. The plate is now urged forward by spring 83 to seat the follower 82 against the trailing end of the casing as shown in FIG. 3. The follower 82 is now under the influence of spring 83 and is able to track the end of the casing.

When port A is pressurized, emulsion pump 28 (FIG. 2) is started so product can flow from the pump into the conduit 32, and from the conduit discharge 52 directly into the aft end 14 of the tubular core. The introduction of food product into the conduit 32 exerts a pressure on the tubular core which tends to force the casing article 21 to the right, as viewed in FIG. 3. This acts to thrust flange 18 against lugs 92, 92'. With the lugs engaged against the flange and, in particular, against the axially and radially disposed abutment surfaces of ratchet steps 20 of the flange, the lugs 92, 92' become driving parts so that rotation of sleeve 34 will drive and rotate the cored casing article 21. This driving engagement can be enhanced by having the profile of lugs 92, 92' match the profile of ratchet steps 20. If desired, a portion of clamps 67, 69 may be arranged to float against the casing article in order to prevent the article from whipping as it rotates.

It also should be noted that the jaws 84, 84' of the centrifugally operated chuck act as a thrust bearing and take up the force exerted on the core by the food emulsion being pumped through the core. This prevents the fore end 16 of the core from being forced too far forward into the forward chuck 36. However, as a safety feature, rib 19 adjacent to the fore end 16 of the tubular core, preferably, is large enough to prevent the emulsion pressure from forcing the core through emulsion seal 45 and passage 39 should there be a failure of core flange 18 or of a jaw member 84, 84'.

As the food product is forced through the tubular core body 12, it unseats plug 26 (FIG. 1) from within the bore. Food product now enters the casing. As the casing fills with food product, the casing deshirrs from the casing supply 22 and exits through the passage 39 in the rotating chuck 36 at the fore end of the stuffing machine as shown in FIGS. 2 and 3.

As the casing deshirrs, it is snugged to the core by emulsion seal 45 and moves longitudinally between the core and the emulsion seal.

Flutes 43 within chuck 36 grip and rotate the stuffed casing, as is conventional, so that the rotating stuffed casing, which passes through chuck 36, can be formed into links by a conventional linking mechanism shown at 48 in FIG. 2.

The stuffing of casing 22 to produce the encased product, and the subsequent linking of this product continues until the supply of casing contained in strand 22 is exhausted. When this occurs, follower 82 moves a sufficient distance so that contact 100 is closed. Closing contact 100 issues a signal to indicate that the supply of casing is near to exhaustion so that an appropriate control means (not shown) can operate to initiate the shut-down of pump 28.

The presence of rib 15 (FIG. 1), which prevents movement of the shirred aft end portion 27 along the core, insures that any movement of the casing trailing end is a true indication of casing run out. Accordingly, the movement of this trailing end, as sensed by the means shown or by another appropriate end-of-casing sensor, can be relied upon to initiate termination of the stuffing operation.

After pump 28 is shut down, motor 38 is turned off. Pressure in air cylinder 77 is switched to port B to retract the piston rod 81 and stop 81a. Stop 81a contacts plate 85 and moves the plate against the bias of spring 83 so that the follower 82 is retracted against sleeve 34. The follower is now fixed to move in concert with sliding conduit 32. Clamps 67, 69 are reapplied about the core 12 which is now bare of casing. The sliding conduit 32 is withdrawn to the phantom line position, as shown in FIG. 3. Because lugs 92, 92' are positioned in front of flange 18, this withdrawing movement of the conduit 32 pulls the sleeve 34 and empty core 12 against the friction of closed clamps 67, 69 and to the left, as viewed in FIG. 3, until the fore end 16 of the core is free of forward chuck 36. Moving the sleeve to the left eventually brings the outer edges 94, 94' of the centrifugally operated clutch 66 against cam surface 78. The cam surface pinches these edges together and forces the clutch jaws 84, 84' to open thereby releasing flange 18.

Thereafter, with clamps 67, 69 still in position against the core, the withdrawing movement of conduit 32 causes the aft end 14 of the core to pull free from the tapered inlet 62 of sleeve 34 and disengage from the conduit 32. With this disengagement accomplished, clamps 67, 69 are released and the spent tubular core 12 is moved by carrier 51 (FIG. 5) to the strip position while a fresh casing article is moved, by carrier 51, to the stuff position.

Referring again to FIG. 2, it is seen that at the strip position, push rod 71 is inserted through a spent core 12' for purposes of expelling any food emulsion remaining in the core. This emulsion is collected in a container 73 and recycled through the stuffing process.

Thus, it should be appreciated that the present invention provides a novel casing article including a core member and a casing strand carried on the core. This core improves the resistance of the casing strand to breakage when subjected to the rigors of both manual handling and handling by an automatic stuffing apparatus. The core can be utilized as the stuffing horn as described herein, or in the alternative, it can be located over the stuffing horn of a stuffing machine appropriately modified to handle such cored casing articles. In either event, the core will be a disposable, one use, item.

The core member 10 has an engagement means on the aft end 14. As described hereinabove, the engagement means is a flange 18, preferably including the driven parts of ratchet steps 20. Those skilled in the art will understand that the engagement means could have alternate configurations.

The invention also provides apparatus and method for utilizing the novel casing article in the automatic production of encased products such as frankfurters and the like. In this respect the apparatus provides a novel drive means for engaging, centering, and spinning the cored casing article about its longitudinal axis. It also provides the necessary seal means at both the fore and aft ends of the casing article, which allow the introduction of food product into the core, and from the core into the casing.

The spring biased end-of-casing sensor as disclosed herein, is self adjusting in that it automatically locates and fixes on the trailing end of the casing when the casing article is mounted to the stuffing apparatus. The spring bias maintains the sensor against the trailing end of the casing and allows the sensor to track this trailing end so that shutdown of the stuffing operation will not be initiated until the casing supply is exhausted.

As mentioned herein above the preferred shirring method is the subject of U.S. Pat. No. 3,779,284. As disclosed in the '284 patent, the shirred stick has a repetitive succession of zones throughout its length. In one zone the pleats are rotationally displaced in one direction and then, in another zone, the pleats are rotationally displaced in the opposite direction. Between these two zones is a third, transitional zone, in which there is no rotational displacement of the pleats. This permits the casing to deshirr without twisting about the rotating core.

Having thus described the invention in detail, what is claimed as new is:

1. Stuffing apparatus for producing encased food products such as frankfurters and the like comprising:
    (a) a conduit for food product including a discharge outlet;
    (b) a rotatable chuck spaced forward from and axially aligned with said discharge outlet, said chuck having a central passage permitting the passage of an encased food product through said chuck;
    (c) said discharge outlet and rotatable chuck being adapted to accomodate a casing article therebetween, the casing article including a substantially rigid tubular core having a fore end receivable in said rotatable chuck, an aft end receivable in said discharge outlet, a drivable part, and a shirred compacted casing disposed on the core for deshirring over the fore end of said core and through said rotatable chuck;
    (d) said conduit being displaceable longitudinally forward towards said rotatable chuck and onto the aft end of a said tubular core held between said discharge outlet and rotatable chuck and said conduit including means for receiving and locating within said discharge outlet the aft end of a said tubular core responsive to the forward displacement of said discharge outlet;
    (e) aft drive means displaceable with and rotatable about said discharge outlet and releaseably engagable with said drivable part on said tubular core when the aft end of a said core is received within said discharge outlet for rotating said core about its longitudinal axis; and
    (f) means for rotating said chuck and said drive means at substantially the same speed.

2. Stuffing apparatus as in claim 1 wherein said aft drive means includes a centrifugally operated clutch activated to close inwardly and drivingly engage about a said core upon rotation of said aft drive means.

3. Stuffing apparatus as in claim 1 including a bearing means on said conduit about said discharge outlet rotatably supporting said aft drive means.

4. Stuffing apparatus as in claim 2 wherein said clutch includes a pair of generally U-shaped jaws, each jaw having a leg of said U-shape arranged in interlocking fashion with the other of said jaws and said jaws being radially movable responsive to centrigual force to close said interlocking legs about the aft end of said core.

5. Apparatus for stuffing a flexible tubular casing with foodstuff, comprising
    (a) means for delivering flowable foodstuff under pressure through an outlet;
    (b) means for disposing and holding releasably in a stuff position spaced from and axially aligned with said outlet a shirred casing article comprising a substantially rigid straight cylindrical tube that forms a passageway for the foodstuff and has gripped onto said tube the pleats of a shirred and longitudinally compacted length of said casing of which an unshirred forward portion is extended over the fore end of said tube said article further having a part thereon drivable about the longitudinal axis of said tube to rotate said shirred casing article about said longitudinal axis;

(c) connector means displaceable relative to a said article held in said stuff position for connecting the aft end of said tube of the article in communication with said outlet so as to pass foodstuff delivered from said outlet into and through said tube for filling and pressing forward casing extended over said fore end from said pleats; and (d) rotary drive means including at least one rotatable driving part displaceable to and away from a location thereof for driving said drivable part of a said article having its said tube connected in communication with said outlet, said at least one driving part in said driving location being engagable with said drivable part to rotate the said article including its said tube and the pleats thereon about the longitudinal axis of the tube while foodstuff is being passed through the tube to stuff the casing.

6. Apparatus according to claim 5, including means for moving said at least one driving part to said driving location upon displacement of said connector means to its position for connecting a said tube aft end in communication with said outlet.

7. Apparatus according to claim 5, said drivable part being on an aft end portion of said tube of said casing article at a location backward of the pleats thereon; said connector means including a sleeve rotatable about and displaceable axially relative to the logitudinal axis of said tube of said article in said stuff position; and said at least one driving part being carried on said sleeve and being displaceable radially relative to said sleeve to and from a position for driving engagement with said drivable part of the said article.

8. Apparatus according to claim 7, a said article having the aft end of its said tube connected in communication with said outlet is shiftable axially forward a limited distance by the pressure of foodstuff passed into its said aft end to hold said drivable part and said at least one driving part in engagement for rotating the said article.

9. Apparatus according to claim 5, including means responsive to the pressure of foodstuff passing into the aft end of a said tube connected in communication with said outlet for activating said rotary drive means to rotate the said article about said axis.

10. Apparatus for stuffing a flexible tubular casing with foodstuff for the production of food products such as frankfurters and the like, comprising:

(a) means for delivering the foodstuff under pressure through an outlet;

(b) means for disposing and holding releaseable at a position in axial alignment with, and spaced longitudinally from, said outlet a shirred casing article comprising a substantially rigid straight cylindrical tube that forms a passageway for the foodstuff and has gripped onto said tube the pleats of a shirred and longitudinally compacted length of said casing of which a deshirred portion is extended over a fore end of said tube, said tube having on an aft end portion thereof backward of said pleats a part drivable to rotate said tube about its longitudinal axis;

(c) connector means displaceable axially relative to a said article in said position to connect and seal the aft end of said tube of said casing article in communication with said outlet; and (d) drive means including at least one rotatable driving part displaceable to and away from a driving location for driving said drivable part of said tube so as to rotate about said axis said tube and thereby said pleats and foodstuff in the tube while foodstuff is being passed through the tube to stuff said casing length.

11. Apparatus according to claim 10 and further comprising:

rotary means spaced away from and aligned with said outlet for engaging and rotating about said axis a said deshirred casing portion stuffed with the foodstuff and extending forward from the fore end of said tube of a said casing article.

12. Apparatus according to claim 11, said rotary means comprising an annular chuck device arranged to rotate about said stuffed casing portion and having inwardly protruding elements to press inward and rotate said stuffed casing portion, said chuck device having an inlet end and guide means on said inlet end for guiding the fore end of the tube of a said casing article into said inlet end.

13. Apparatus according to claim 11 and further comprising means for synchronously driving said drive means and said rotary means so as to rotate said casing article and said stuffed casing portion at substantially the same speed.

14. Apparatus according to claim 13, said rotary means comprising an annular chuck device arranged to rotate about and carrying elements to press inward on and rotate said stuffed casing portion;

said drive means comprising a sleeve arranged to surround and rotate about said aft end portion of said tube of a said casing article, said sleeve carrying said at least one driving part;

said means for synchronously driving said drive means and said rotary means comprising a first rotary driving gear engaging and for rotating said chuck device, a driven gear rotated by said chuck device, and a second rotary driving gear connected for rotation with said driven gear and engaging said sleeve to rotate it in unison with said chuck device.

15. Apparatus according to claim 14, said at least one driving part being displaceable radially to and from an inward position thereof in which each said driving part is drivingly engageable with said drivable part of said tube, and being connected with means operative upon rotation of said sleeve to displace said at least one driving part to and hold the same in said inward position by centrifugal force.

16. Apparatus according to claim 10, said at least one driving part when at said driving location being disposed radially outward of and being rotatable about said aft end portion of a said tube connected and sealed in communication with said outlet, and being displaceable radially to and from an inward position thereof in which each said driving part is drivingly engageable with said drivable part of said tube.

17. Apparatus according to claim 16, said drive means further comprising means connected with said at least one driving part and operative upon rotation of said drive means to displace said at least one driving part to and hold the same in said inward position by centrifugal force.

18. Apparatus according to claim 10, said outlet being an end opening of a longitudinally displaceable conduit for the foodstuff, said displaceable connector means comprising a sleeve rotatable about and connected for axial movement with said conduit, said sleeve having a forward inlet axially aligned with said outlet for receiving slidably and sealing about the aft end of said tube of a said shirred casing article in said position and means operable to move said sleeve axially forward over said aft end so as to receive said aft end into said inlet.

19. Apparatus according to claim 18, said at least one driving part being carried by said sleeve and displaceable radially thereon to and from an inward position in which each said driving part is drivingly engageable with said drivable part of a said tube having its aft end received and sealed in said inlet, and means connected with each said driving part and operative upon rotation of said sleeve to displace the driving part to and hold it in said inward position by centrifugal force.

20. Apparatus according to claim 19, said at least one driving part comprising two driving parts constituted by radially displaceable lugs disposable by said sleeve at opposite sides of said aft end of a said tube, said means to displace said driving parts comprising generally U-shaped, oppositely displaceable jaws each of which includes a relatively heavy head portion at one side of the tube longitudinal axis and connected by a base portion of the jaw to a leg portion thereof disposed at the opposite side of said axis and having one of said lugs thereon, said jaws being connected for rotation with and for limited radial movement relative to said sleeve, and said head portions being displaceable radially outward from said axis by centrifugal force to carry said leg portions and said lugs thereon inward to a position for driving engagement with said drivable part.

21. Apparatus according to claim 20, said U-shaped jaws each having inner and outer side guide portions respectively engaging a surface of the other jaw and a guide surface on said sleeve for limiting said jaws to radial movement relative to said sleeve.

22. Apparatus according to claim 20, said means to move said sleeve axially forward being operable also to move the same backward to a retracted position away from the aft end of a said tube received and sealed in said inlet;
said lugs bearing against said drivable part in an initial backward movement of said sleeve to displace said tube backward;
said head portions of said jaws having peripheral surfaces disposed outward of said sleeve;
said apparatus including relatively fixed cam surfaces disposed about said sleeve in position to be engaged by said peripheral surfaces and to force them inward upon further backward movement of said sleeve, thereby displacing said lugs away from said drivable part to permit movement of said sleeve to said retracted position.

23. Apparatus according to claim 22, said cam surfaces being on fixed arcuate structures spaced apart about the axis of said sleeve so as to provide axially disposed slots between said structures, an upper of said slots being arranged to pass through it an aft end portion of a said casing article to be positioned axially in alignment with said outlet and a lower of said slots being arranged to pass through it the aft end portion of a said tube depleted of casing.

24. Apparatus according to claim 22, said sleeve comprising means yieldably engaging with means on parts of said jaws when said lugs are displaced away from said drivable part to keep said lugs from being displaced inward by the weight of said head portions while said sleeve is not rotated.

25. Apparatus according to claim 18 and further including:
follower means disposed forward of said sleeve to bear against the aft end pleats of a said casing article positioned in alignment with said outlet;
means for yieldably biasing said follower means forward against said aft end pleats;
said means operable to move said sleeve axially forward being operable also to move the same backward to a retracted position away from the aft end of the tube of a said casing article, and having connected therewith retaining means operable upon backward movement of said sleeve to inactivate said biasing means and to displace said follower means backward to a position clear of the aft end of said tube.

26. Apparatus according to claim 25, said retaining means including a piston connected for movement with said means to move said sleeve; said piston having a piston rod carrying a stop engagable with a part connected with said follower means so as to inactivate said biasing means and then move the follower means backward with said sleeve; and said piston being operable when said sleeve has been displaced forward to receive and seal the aft end of the tube of a said article to move said stop away from said connected part and thus reactivate said biasing means.

27. Apparatus according to claim 18, said inlet comprising a tapered forward portion and being operative to guide said tube aft end through said inlet and into said end opening of said conduit upon forward movement of said sleeve over said tube aft end.

28. Apparatus as in claim 27, further comprising seal means within said sleeve at a location between said tapered portion and said conduit end opening for effecting a sealing engagement about a tube aft end portion received with said inlet.

29. Apparatus according to claim 27, for a said casing article of which said drivable part comprises an annular flange fixed about said aft end portion of said tube and presenting a radially disposed abutment surface engageable by said at least one driving part, wherein said inlet comprises forward of said tapered portion a mouth portion larger in inside diameter than the outside diameter of said annular flange and each said driving part is carried at said mouth portion of said inlet and when in said inward portion is disposed forward of said annular flange on a said tube aft end portion received within said inlet, whereby at least one driving part prevents displacement of said tube aft end portion out of said inlet by the pressure of foodstuff passed through said outlet into said tube.

* * * * *

UNITED STATES PATENT AND TRADEMARK OFFICE
CERTIFICATE OF CORRECTION

PATENT NO. : 4,583,264

DATED : April 22, 1986

INVENTOR(S) : Joseph A. Nausedas

It is certified that error appears in the above—identified patent and that said Letters Patent is hereby corrected as shown below:

In the title, "CASTING" should be "CASING"

Column 3, lines 32-35 "Fig. 1 is a view, partly broken away and in section, as may be provided for use with a stuffing machine according to the cored casing article of the present invention;" should be "Fig. 1 is a view, partly broken away and in section, of the cored casing article as may be provided for use with a stuffing machine according to the present invention;"

Column 3, line 37, "providing" should be "provided"

Column 6, line 26, "being" should be "begin"

Column 8, line 2, "though" should be "through"

Signed and Sealed this

Fifth Day of July, 1988

*Attest:*

DONALD J. QUIGG

*Attesting Officer*  *Commissioner of Patents and Trademarks*